US006443670B1

(12) United States Patent
Haas et al.

(10) Patent No.: US 6,443,670 B1
(45) Date of Patent: Sep. 3, 2002

(54) POWDER COATING EQUIPMENT HAVING ZERO-SUM CONTROL OF CONVEYANCE AND SUPPLEMENT AIR LINES

(75) Inventors: Gerald Haas; Hans Peter Michael, both of St. Gallen (CH)

(73) Assignee: ITW Gema AG, St. Gallen (CH)

( * ) Notice: Subject to any disclaimer, the term of this patent is extended or adjusted under 35 U.S.C. 154(b) by 0 days.

(21) Appl. No.: 09/763,313

(22) PCT Filed: Jun. 9, 1999

(86) PCT No.: PCT/EP99/03968

§ 371 (c)(1), (2), (4) Date: Feb. 22, 2001

(87) PCT Pub. No.: WO00/10727

PCT Pub. Date: Mar. 2, 2000

(30) Foreign Application Priority Data

Aug. 22, 1998 (DE) ........................................ 198 38 269

(51) Int. Cl.[7] ................................................ B65G 53/04

(52) U.S. Cl. ........................... 406/93; 406/92; 406/194; 406/195; 118/308; 239/427.3

(58) Field of Search ............................. 406/14, 34, 73, 406/92, 93, 194, 195; 118/308; 239/427.3

(56) References Cited

U.S. PATENT DOCUMENTS

| | | | | |
|---|---|---|---|---|
| 3,625,404 A | * 12/1971 | Probst | ........................ | 222/193 |
| 5,131,350 A | 7/1992 | Buschor | | |
| 5,351,903 A | 10/1994 | Mazakas et al. | | |
| 5,487,624 A | 1/1996 | Toyota | | |
| 5,702,209 A | * 12/1997 | Mauchle | ...................... | 406/12 |
| 5,906,858 A | * 5/1999 | Huber et al. | ................ | 427/180 |

FOREIGN PATENT DOCUMENTS

| | | | | |
|---|---|---|---|---|
| DE | 1 266 685 | * | 6/1967 | |
| DE | 44 09 493 A1 | * | 3/1994 | ........... B65G/53/66 |
| EP | 0 412 289 A2 | * | 7/1990 | ............. B05B/5/16 |
| EP | 0 634 713 A | | 1/1995 | |

* cited by examiner

*Primary Examiner*—Christopher P. Ellis
*Assistant Examiner*—Joe Dillon, Jr.
(74) *Attorney, Agent, or Firm*—Lowe Hauptman Gilman & Berner, LLP

(57) ABSTRACT

Powder-coating equipment comprises two throttles (6, 16) each mounted in one of a conveyance-air line (8) and a supplemental-air line (18). The throttles' flow impedance' are adjustable in a motorized manner by providing throttle with its own adjustment motor (4, 14). The adjustment motors, such as electric stepping motors and/or servo-motors are driven by an electronic control unit (2).

20 Claims, 1 Drawing Sheet

POWDER COATING EQUIPMENT HAVING ZERO-SUM CONTROL OF CONVEYANCE AND SUPPLEMENT AIR LINES

TECHNICAL FIELD OF THE INVENTION

The invention relates to powder coating equipment comprising a line for conveyance air and at least one line of supplemental air, both being connected to an injector to pneumatically move coating powder using the conveyance air of the conveyance line and the supplemental air of the at least one supplemental-air line.

BACKGROUND ART

As shown by the versatile state of the art, diverse research and development has followed many approaches to attain optimal operational setpoints using simple steps. However success so far has been elusive. The German patent 1 266 685 discloses the basic principle of an injector pneumatically moving coating powder. The European patent document 0 412 289 B discloses an electrostatic powder coating system containing a display for the total volumetric flow in a feed line of compressed air to the conveyance-air line and to the supplemental air line and a pressure regulator in each of a conveyance-air line and a supplemental-air line. When changing the total volumetric flow by adjusting its associated pressure regulator for the purpose of commensurately changing the flow of powder, the entailed change in the volumetric flow may be eliminated again by correspondingly adjusting the pressure regulator of the supplemental air line. The pressure regulators also may be automatically controlled by a microcomputer instead of being controlled manually. A minimum air flow is required in a powder line from the injector to a spray device or to a container in order to avert powder deposits and flow pulsations in the powder line. The powder flow in the powder line should be as constant as possible, i.e., it should not unduly fluctuate. On that account more supplemental air must be added if the rate of conveyance air must be reduced to such an extent when a small powder flow is desired that—absent this supplemental air—the total air no longer would suffice. Beyond a partial-vacuum zone of the injector wherein the conveyance air aspirates powder, the supplemental air is introduced into the flow of powder/conveyance-air. In a design variation, or additionally, supplemental air also may be introduced into the partial-vacuum zone in order to vary the partial-vacuum generated by the conveyance air. As a result, when reducing the volumetric flow of conveyance air, the volumetric flow of supplemental air will be increased, and vice-versa. A similar system having a pressure regulator in each line of conveyance air and in each line of supplemental air is known from FIG. 4 of U.S. Pat. No. 3,625,404. Furthermore air-dividing valves are known from said US patent and from the German patent document 44 09 493 A which are fitted with a throttling valve in the conveyance-air line and a throttling valve in the supplemental-air line, said valves being mechanically interlinked and adjusted manually or using motors, whereby, as one throttle is being opened wider, the other shall be closed further. FIG. 3 of said US patent shows an air-divider valve of which the valve chamber and the valve seat can be manually set relative to each other to attain a setpoint for one air flow being larger or smaller than the other. However such mechanically interlinked throttling valves incur the drawback that the setpoint of the differential of the volumetric flows of conveyance air and supplemental air shall be applicable only for very specific kinds of powder and only for a very specific configuration of the powder-coating system, so that, when changing to different kinds of powders, or when changing system components affecting flow conditions, and when changing the flow or timing at which the objects to be coated are being moved past a spray device, said setpoint will not be automatically variable, and new settings shall require interrupting the automated coating procedure. Another drawback of this state of the art is that such manually implemented setpoints require considerable operator experience to secure identical setpoints for recurring identical coating processes. The known mechanical air dividers also can be manufactured only with great difficulty to offer the required high accuracy. On the other hand, using pressure regulators instead of such air dividing valves also incurs the drawback that the volumetric air flow and the powder rate are non-linearly related to the pressures of the conveyance air and of the supplemental air.

SUMMARY OF THE INVENTION

This problem is solved by inventive coating equipment comprising a container for containing a coating material, an injector communicated with the container, and a conveyance-air line and at least one supplemental air line connected to the injector. The lines supply conveyance air and supplemental air to the injector for pneumatically sucking the coating material from the container into the injector and moving the sucked coating material toward an object to be coated. A plurality of throttles each mounted in one of the conveyance-air line and the at least one supplemental-air line are equipped with adjustment motors for adjusting a cross section of the throttle, and hence, an air flow of the line. The equipment further comprises an electronic control unit that electrically and mutually adjusts the adjustment motors of all the throttles as a function of a setpoint of a volumetric total air flow of the conveyance air and the supplemental air, and as a function of a setpoint of a material rate at which the coating material is to be applied to the object.

This problem is solved by the invention by means of the features of claim 1.

In accordance with the present invention, when an electric stepping motor is used to adjust the throttles, feedback of actual values to the control unit no longer is required for purposes of control or regulation because the control unit intrinsically always knows how many steps the stepping motor has carried out in either direction of rotation. The control unit is wholly electronic and preferably comprises one or several microprocessors.

The control unit is wholly electronic and preferably comprises one or several microprocessors.

The setpoints for the total volumetric flow, for the required rate of powder and other values may be fed to the control unit. Moreover the control unit can be controlled or regulated automatically by an overriding control center or main computer as a function of objects to be coated, for instance when there is a change in the kind of powder, in the desired coating thickness and/or timing or the conveyance rate at which the objects being coated move past a spray device.

BRIEF DESCRIPTION OF THE DRAWING

The invention is elucidated below by means of a preferred and illustrative embodiment.

The single FIG. 1 schematically shows powder-coating equipment of the invention.

DETAILED DESCRIPTION OF THE INVENTION

Figure 1:
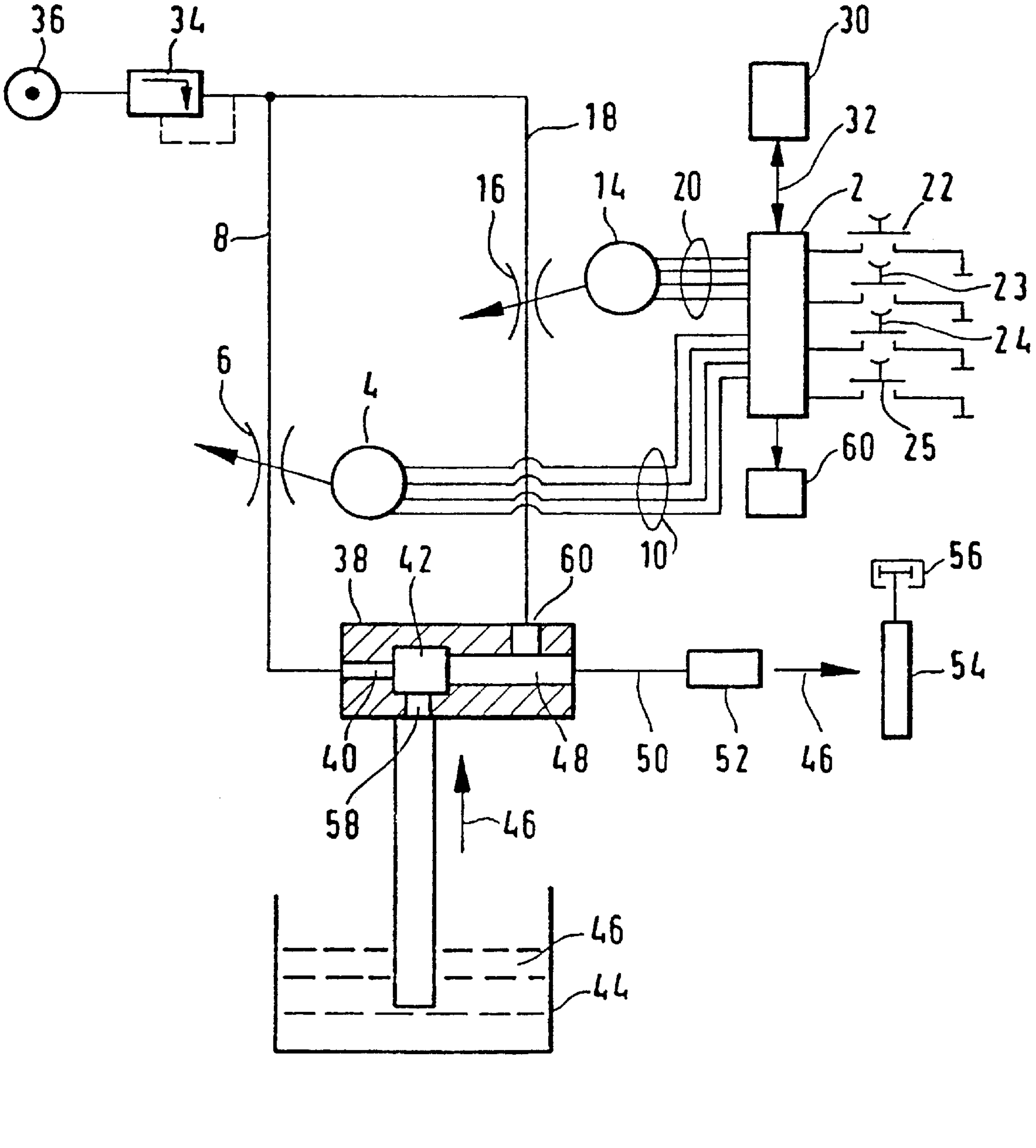

The power-coating equipment of the invention shown in FIG. 1 comprises an electronic control unit 2 which controls an electric stepping motor 14 electrically adjusting a variable flow throttle 16 in a supplemental air line 18 through electric lines 10 or 20 as a function of a setpoint powder rate (quantity of powder per unit time) and as a function of a setpoint total volumetric flow of air (total air per unit time) consisting of conveyance air of the conveyance-air line 8 and supplemental air of the supplemental-air line 18. There are also provided a key 22 to raise the setpoint of powder rate, a key 23 to reduce the setpoint powder rate, a key 24 to raise the setpoint volumetric air flow and a key 25 to reduce the setpoint volumetric air flow are used. Each key is driven, e.g., manually. In an embodiment variation, the electronic control unit 2 also may contain one or more computer programs to automatically adjust the setpoints of the powder rate and the total volumetric air flow as a function of the objects to be coated, further of their speed or their timing, of the desired coating thickness, the kind of powder to be used (granularity, plastic, ceramics) and/or other criteria. Such computer program(s) may be housed not in the control unit 2 but instead in an overriding control center 30 exchanging data through a data bus 32 with the control unit 2.

The upstream ends of the conveyance-air line 8 and the supplemental-air line 18 are connected through a pressure regulator 34 to a common source of compressed air 36.

The downstream ends of the conveyance-air line 8 and the supplemental-air line 18 are connected to an injector 38. The conveyance-air flow of the conveyance-air line 8 moves from an injector nozzle 40 through a partial-vacuum zone 42—wherein said flow generates the partial vacuum and thus aspirates coating powder 46 out of a powder container 44—and then into collecting duct 48 and from there, together with the aspirated powder, through a powder line 50 into a further container, or, as shown in FIG. 1, to a spray device 52. Preferably the spray device 52 is designed to electrostatically charge the powder. It may be in the form of a manual or automatic spray gun or a rotational atomizer or the like. Said spray device sprays the pneumatically conveyed powder 46 for the objects 54 to be coated, said objects being automatically moved by a conveyor system 56 past the spray device at its spraying side.

A powder suction aperture 58 of the injector 38 issues into the partial vacuum zone 42. Instead of being configured underneath the injector 38, the container 44 also may be mounted above it.

The downstream end of the supplemental air line 18 is connected to a supplemental-air aperture 60 of the injector 38 from where said supplemental air flows into the powder/conveyance-air flow of the collecting duct 48.

To change the rate of conveyed powder, or to keep it constant when the kind of powder changes, the volumetric conveyance air of the conveyance air line 8 is correspondingly adjusted by driving the adjustment motor 4 at the variable throttle 6 by means of the control unit 2. In order to compensate the total air content which is changed thereby in the air/powder flow, the volumetric supplemental air flow of the supplemental air line 18 is also correspondingly adjusted by adjusting its throttle 16 using the adjustment motor 14.

Several lines instead of the single line of supplemental air 18 also may be used and may issue into the collecting duct 48 or upstream or downstream from it into the flow path of the powder and conveyance air.

Other motors than the electric stepping motors 4 and 14 acting as adjustment motors can be used, for instance servo-motors. In all cases the mutual control or regulation of the throttles 6 and 16 by their motors is carried out in purely electrical manner by means of the electronic control unit 2. Electrical stepping motors offer the advantage over hydraulic motors that the control unit 2 "knows" at all times the adjustment of the pertinent throttle 6 or 16 because it automatically knows how many steps were taken by the stepping motor in either direction of rotation.

The throttles 6 and 16 may be adjustable diaphragms or adjustable valves or cocks.

A display 60 shows the setpoint values and the actual values of the volumetric flow of conveyance air, of the flow of supplemental air, of the total volumetric flow of conveyance air and supplemental air, and of the rate of powder.

The rate of powder is approximately proportional; to the flow (quantity per unit time) of conveyance air in the conveyance-air line 8. Accordingly the conveyance air need only be adjusted by means of the keys 22 and 23 in order to set a desired powder rate. The control unit 2 then automatically sets the rate of supplemental air by means of the adjustment motor 14 and the throttle 16 in such manner that in spite of the change in rate of conveyance air, the rate of the total volumetric air flow (total air rate) remains at the setpoint value in effect.

At constant air pressure at the pressure regulator 34, the rate of conveyance and that of the supplemental air will only change proportionately to a change in the flow cross-sections of their throttles 6 and 16 if the downstream flow impedance is very small. However, as regards equipment of the present design comprising an injector and a powder line 50 however, the flow impedance is so large that the rates of conveyance air and of supplemental air do not change linearly in relation to changes in the flow cross-sections of the throttles 6 and 16. In a preferred embodiment of the invention, the non-linear function of at least one, or several flow impedance(s) (different injector 38 and/or powder lines 50) is stored in the form of plots in the control unit 2, and this control unit non-linearly drives the throttles 6 and 16, by means of the adjustment motors 4 and 14, as a function of setpoint values, for instance at the keys 22, 23, 24 and 25, in such manner that a change in setpoint value entails a linear change of the rate of conveyance air and/or that of the supplemental air.

In a preferred implementation of the invention, the spray device 50 is a manual spray gun on which are mounted the finger-actuated keys 22 and 23, preferably also the keys 24 and 25.

What is claimed is:

1. Coating equipment, comprising:

a container for containing a coating material;

an injector communicated with said container;

a conveyance-air line and at least one supplemental air line connected to said injector and supplying conveyance air and supplemental air, respectively, to said injector for pneumatically sucking the coating material from said container into said injector and moving the sucked coating material toward an object to be coated;

a plurality of throttles each mounted in one of the conveyance-air line and the at least one supplemental-air line and equipped with an adjustment motor for adjusting a cross section of said throttle, and hence, an air flow of said line; and an electronic control unit that electrically and mutually adjusts the adjustment motors of all said throttles as a function of a setpoint of a volumetric total air flow of the conveyance air and the supplemental air, and as a function of a setpoint of a material rate at which the coating material is to be applied to said object.

2. The equipment of claim 1, wherein the electronic control unit has data on adjustment position and direction of at least one of said adjustment motors, and a current state of the cross section of the throttle adjusted by said adjustment motor is always determinable by the electronic control unit.

3. The equipment of claim 1, wherein the coating material is a powder.

4. The equipment of claim 3, wherein the electronic control unit has data on adjustment position and direction of at least one of said adjustment motors, and a current state of the cross section of the throttle adjusted by said adjustment motor is always determinable by the electronic control unit.

5. Coating equipment as claimed in claim 1, wherein of conveyed air by means of said control unit (2) driving the particular adjustment motor (4, 14) in non-linear manner;

the air flow of at least one of said lines changes as a non-liner function of the cross section of the throttle installed in said line;

said non-liner function is stored in the electronic control unit; and using said stored non-linear function, the electronic control unit non-linearly drives the adjustment motor of the throttle installed in said line so that the air flow in said line changes as a linear function of said setpoints.

6. The equipment of claim 2, wherein the electronic control unit stores a plurality of said non-linear functions corresponding to various flow impedances of various configurations of a flow path which is downstream of the throttle installed in said line and includes said injector.

7. The equipment of claim 5, wherein the electronic control unit has data on adjustment position and direction of at least one of said adjustment motors, and a current state of the cross section of the throttle adjusted be said adjustment motor is always determinable by the electronic control unit.

8. The equipment of claim 7, wherein said non-linear function is stored in the electronic control unit as a plot.

9. The equipment of claim 5, wherein said non-liner function is stored in the electronic control unit as a plot.

10. The equipment of claim 5, wherein the coating material is a powder.

11. The equipment of claim 10, wherein the electronic control unit has data on adjustment position and direction of at least one of said adjustment motors, and a current state of the cross section of the throttle adjusted by said adjustment motor is always determinable by the electronic control unit.

12. The equipment of claim 11, wherein said non-liner function is stored in the electronic control unit as a plot.

13. Powder-coating equipment, comprising:

a container for containing a coating powder;

an injector communicated with said container;

a conveyance-air line and at least one supplemental air line connected to said injector and supplying conveyance air and supplemental air, respectively, to said injector for pneumatically sucking the coating powder from said container into said injector and moving the sucked coating powder toward an object to be coated;

a plurality of throttles each mounted in one of the conveyance-air line and the at least one supplemental-air line and equipped with an adjustment motor for adjusting a flow impedance of said line; and an electronic control unit that electrically and mutually adjusts the adjustment motors of all said throttles as a function of a setpoint of a volumetric total air flow of the conveyance air and the supplemental air, and as a function of a setpoint of a powder rate at which the coating powder is to be applied to said object;

wherein the adjustment motors are electrical stepping motors.

14. Powder coating equipment as claimed in claim 13, wherein of conveyed air by means of said control unit (2) driving the particular adjustment motor (4, 14) in non-linear manner;

an air flow of at least one of said lines changes as a non-liner function of a cross section of the throttle installed in said line;

said non-liner function is stored in the electronic control unit; and using said stored non-linear function, the electronic control unit non-linearly drives the adjustment motor of the throttle installed in said line so that the air flow in said line changes as a linear function of said setpoints.

15. The equipment of claim 14, wherein the electronic control unit stores a plurality of said non-linear functions corresponding to various flow impedances of various configurations of a flow path which is downstream of the throttle installed in said line and includes said injector.

16. The equipment of claim 14, wherein said non-linear function is stored in the electronic control unit as a plot.

17. Powder-coating equipment, comprising:

a container for containing a coating powder;

an injector communicated with said container;

a conveyance-air line and at least one supplemental air line connected to said injector and supplying conveyance air and supplemental air, respectively, to said injector for pneumatically sucking the coating powder from said container into said injector and moving the sucked coating powder toward an object to be coated;

a plurality of throttles each mounted in one of the conveyance-air line and the at least one supplemental-air line and equipped with an adjustment motor for adjusting a flow impedance of said line; and an electronic control unit that electrically and mutually adjusts the adjustment motors of all said throttles as a function of a setpoint of a volumetric total air flow of the conveyance air and the supplemental air, and as a function of a setpoint of a powder rate at which the coating powder is to be applied to said object;

wherein the adjustment motors are servo-motors.

18. Powder coating equipment as claimed in claim 17, wherein an air flow of at least one of said lines changes as a non-liner function of a cross section of the throttle installed in said line;

said non-liner function is stored in the electronic control unit; and using said stored non-linear function, the electronic control unit non-linearly drives the adjustment motor of the throttle installed in said line so that the air flow in said line changes as a linear function of said setpoints.

19. The equipment of claim 18, wherein the electronic control unit stores a plurality of said non-linear functions corresponding to various flow impedances of various configurations of a flow path which is downstream of the throttle installed in said line and includes said injector.

20. The equipment of claim 18, wherein said non-linear function is stored in the electronic control unit as a plot.

* * * * *